US012160351B2

(12) United States Patent
Roddom

(10) Patent No.: US 12,160,351 B2
(45) Date of Patent: Dec. 3, 2024

(54) SYSTEMS AND METHODS FOR SITE RELIABILITY ENGINEERING

(71) Applicant: JPMORGAN CHASE BANK, N.A., New York, NY (US)

(72) Inventor: Sangeetha Roddom, Bangalore (IN)

(73) Assignee: JPMORGAN CHASE BANK N.A., New York, NY (US)

( * ) Notice: Subject to any disclaimer, the term of this patent is extended or adjusted under 35 U.S.C. 154(b) by 0 days.

(21) Appl. No.: 18/311,084

(22) Filed: May 2, 2023

(65) Prior Publication Data

US 2023/0353464 A1 Nov. 2, 2023

(51) Int. Cl.
*H04L 41/50* (2022.01)
*H04L 41/5009* (2022.01)
*H04L 43/0852* (2022.01)
*H04L 43/0888* (2022.01)

(52) U.S. Cl.
CPC ...... *H04L 41/5032* (2013.01); *H04L 41/5009* (2013.01); *H04L 43/0852* (2013.01); *H04L 43/0888* (2013.01)

(58) Field of Classification Search
None
See application file for complete search history.

(56) References Cited

U.S. PATENT DOCUMENTS

| | | | | |
|---|---|---|---|---|
| 7,058,704 B1 * | 6/2006 | Mangipudi | ......... | H04L 41/5009 709/200 |
| 8,121,049 B2 * | 2/2012 | Lidstrom | ................ | H04L 43/08 370/252 |
| 8,359,224 B2 * | 1/2013 | Simon | .................. | G06Q 10/067 705/7.27 |
| 8,793,363 B2 * | 7/2014 | Sater | .................... | H04L 41/5054 709/224 |
| 10,277,487 B2 * | 4/2019 | Kakadia | .................. | H04L 41/40 |
| 10,841,190 B1 * | 11/2020 | Moyer | ................ | H04L 41/5074 |
| 11,641,314 B2 * | 5/2023 | Singer | .................. | H04L 41/069 709/224 |
| 11,762,723 B2 * | 9/2023 | Long | .................... | G06F 11/3433 714/704 |

(Continued)

OTHER PUBLICATIONS

Judkowitz et al., SRE fundamentals: SLIs, SLAs, and SLOs, Jul. 19, 2018, Google Cloud Blog, pp. 3-9, https://cloud.google.com/blog/products/devops-sre/sre-fundamentals-slis-slas-and-slos (Year: 2018).*

(Continued)

*Primary Examiner* — Backhean Tiv
(74) *Attorney, Agent, or Firm* — GREENBERG TRAURIG LLP

(57) ABSTRACT

In some aspects, the techniques described herein relate to a method including: defining a user experience based on one or more software services provided by a platform; defining a service level indicator based on service metrics data; tracking an execution of the user experience, wherein the tracking includes recording of metadata that is output by each software service, wherein the metadata is defined as a parameter of the service level indicator; calculating a value of the services level indicator; and determining whether the value of the service level indicator is lower than a threshold value of a service level objective associated with the service level indicator.

20 Claims, 4 Drawing Sheets

(56) References Cited

U.S. PATENT DOCUMENTS

| | | | | |
|---|---|---|---|---|
| 11,775,410 | B2* | 10/2023 | Kumar KN | G06F 11/3006 |
| | | | | 707/609 |
| 11,930,073 | B1* | 3/2024 | Duan | H04L 67/1008 |
| 2017/0104651 | A1* | 4/2017 | Kakadia | H04L 43/04 |
| 2021/0133015 | A1* | 5/2021 | Agarwal | G06F 16/2455 |
| 2022/0124560 | A1* | 4/2022 | Yeh | H04L 41/5025 |
| 2022/0244993 | A1* | 8/2022 | MacDonald | G06F 11/302 |
| 2022/0300344 | A1* | 9/2022 | MacDonald | G06F 11/3447 |
| 2023/0021600 | A1* | 1/2023 | Singer | H04L 41/5016 |
| 2023/0121250 | A1* | 4/2023 | Reineke | G06F 9/5094 |
| | | | | 705/7.37 |
| 2023/0236871 | A1* | 7/2023 | Marzorati | G06F 30/27 |
| | | | | 718/100 |
| 2023/0239222 | A1* | 7/2023 | Singer | H04L 41/5019 |
| | | | | 709/224 |
| 2023/0275816 | A1* | 8/2023 | Kenig | H04L 41/5019 |
| | | | | 709/224 |
| 2023/0353464 | A1* | 11/2023 | Roddom | H04L 43/0888 |
| 2023/0403210 | A1* | 12/2023 | Guha | H04L 41/5009 |

OTHER PUBLICATIONS

Alston, Amber; Thinking in Error Budgets: How Pivotal's Cloud Ops Team Used Service Level Objectives and Other Modern SRE Practices to Improve Outcomes, VMware Tanzu, Sep. 18, 2018.

Beyer, Betsy, et al.; The Site Reliability Workbook: Practical Ways to Implement SRE, OREILLY, Aug. 2018.

Beyer, Betsy, et al.; Site Reliability Engineering: How Google Runs Production Systems, OREILLY, Year 2016.

Adkins, Heather, et al.; Building Secure & Reliable Systems: Best Practices for Designing, Implementing and Maintaining Systems, OREILLY, Mar. 11, 2020.

* cited by examiner

| Availability Level | Allowed Unavailability Window | | |
|---|---|---|---|
| | per year | per quarter | per 28 days |
| 90% | 36.5 days | 9 days | 2.8 days |
| 95% | 18.25 days | 4.5 days | 1.4 days |
| 99% | 3.65 days | 21.6 hours | 6.7 hours |
| 99.5% | 1.83 days | 10.8 hours | 3.4 hours |
| 99.9% | 8.76 hours | 2.16 hours | 40.3 minutes |
| 99.95% | 4.38 hours | 1.08 hours | 20.2 minutes |
| 99.99% | 52.6 minutes | 12.96 minutes | 4.0 minutes |
| 99.999% | 5.26 minutes | 1.30 minutes | 24.2 seconds |

FIGURE 4

SYSTEMS AND METHODS FOR SITE RELIABILITY ENGINEERING

RELATED APPLICATIONS

This application claims the benefit of Indian Provisional Patent Application No. 202211026057, filed May 4, 2022. The disclosures of each of these applications is hereby incorporated, by reference, in its entirety.

BACKGROUND

1. Field of the Invention

Aspects generally relate to systems and methods for site reliability engineering.

2. Description of the Related Art

Modern software architectures are complex and, in many cases, hosted at least partially on a third-party infrastructure that is off premises with respect to developers, network engineers, and business users. A business user may perform a number of interactions with one or more software services. User interactions may define a customer experience that may facilitate an outcome or an output that the user requires for one or more employment responsibilities. In an environment where mission critical user experiences are hosted off premises and on a third-party infrastructure, it becomes beneficial to understand a user's experience with respect to provided software services.

SUMMARY

In some aspects, the techniques described herein relate to a method including: defining a user experience based on one or more software services provided by a platform; defining a service level indicator based on service metrics data; tracking an execution of the user experience, wherein the tracking includes recording of metadata that is output by each software service, wherein the metadata is defined as a parameter of the service level indicator; calculating a value of the service level indicator; and determining whether the value of the service level indicator is lower than a threshold value of a service level objective associated with the service level indicator.

In some aspects, the techniques described herein relate to a method, wherein the service level indicator measures latency of the user experience.

In some aspects, the techniques described herein relate to a method, wherein the service level indicator measures a throughput of the user experience.

In some aspects, the techniques described herein relate to a method, wherein the platform stores the user experience.

In some aspects, the techniques described herein relate to a method, wherein a service level agreement is generated based on the service level objective.

In some aspects, the techniques described herein relate to a method, including: calculating a plurality of service level indicators.

In some aspects, the techniques described herein relate to a method, including: sending, upon a determination that the value of the service level indicator is lower than the threshold value of a service level objective associated with the service level indicator, an alert via a designated channel; and logging the value of the service level indicator.

In some aspects, the techniques described herein relate to a system including at least one computer including a processor, wherein the at least one computer is configured to: store a user experience based on one or more software services provided by a platform; store a service level indicator based on service metrics data; track an execution of the user experience, wherein the tracking includes recording of metadata that is output by each software service, wherein the metadata is defined as a parameter of the service level indicator; calculate a value of the service level indicator; and determine whether the value of the service level indicator is lower than a threshold value of a service level objective associated with the service level indicator.

In some aspects, the techniques described herein relate to a system, wherein the service level indicator measures latency of the user experience.

In some aspects, the techniques described herein relate to a system, wherein the service level indicator measures a throughput of the user experience.

In some aspects, the techniques described herein relate to a system, wherein a service level agreement is generated based on the service level objective.

In some aspects, the techniques described herein relate to a system, wherein the at least one computer is configured to: calculate a plurality of service level indicators.

In some aspects, the techniques described herein relate to a system, wherein the at least one computer is configured to: send, upon a determination that the value of the service level indicator is lower than the threshold value of a service level objective associated with the service level indicator, an alert via a designated channel; and log the value of the service level indicator.

In some aspects, the techniques described herein relate to a non-transitory computer readable storage medium, including instructions stored thereon, which instructions, when read and executed by one or more computer processors, cause the one or more computer processors to perform steps including: defining a user experience based on one or more software services provided by a platform; defining a service level indicator based on service metrics data; tracking an execution of the user experience, wherein the tracking includes recording of metadata that is output by each software service, wherein the metadata is defined as a parameter of the service level indicator; calculating a value of the service level indicator; and determining whether the value of the service level indicator is lower than a threshold value of a service level objective associated with the service level indicator.

In some aspects, the techniques described herein relate to a non-transitory computer readable storage medium, wherein the service level indicator measures latency of the user experience.

In some aspects, the techniques described herein relate to a non-transitory computer readable storage medium, wherein the service level indicator measures a throughput of the user experience.

In some aspects, the techniques described herein relate to a non-transitory computer readable storage medium, wherein the platform stores the user experience.

In some aspects, the techniques described herein relate to a non-transitory computer readable storage medium, wherein a service level agreement is generated based on the service level objective.

In some aspects, the techniques described herein relate to a non-transitory computer readable storage medium, including: calculating a plurality of service level indicators.

In some aspects, the techniques described herein relate to a non-transitory computer readable storage medium, including: sending, upon a determination that the value of the service level indicator is lower than the threshold value of a service level objective associated with the service level indicator, an alert via a designated channel; and logging the value of the service level indicator.

BRIEF DESCRIPTION OF THE DRAWINGS

FIG. 4 is a table that displays exemplary acceptable unavailability windows for given time periods and for a given percentage of availability, in accordance with aspects.

DETAILED DESCRIPTION

Figure 1:
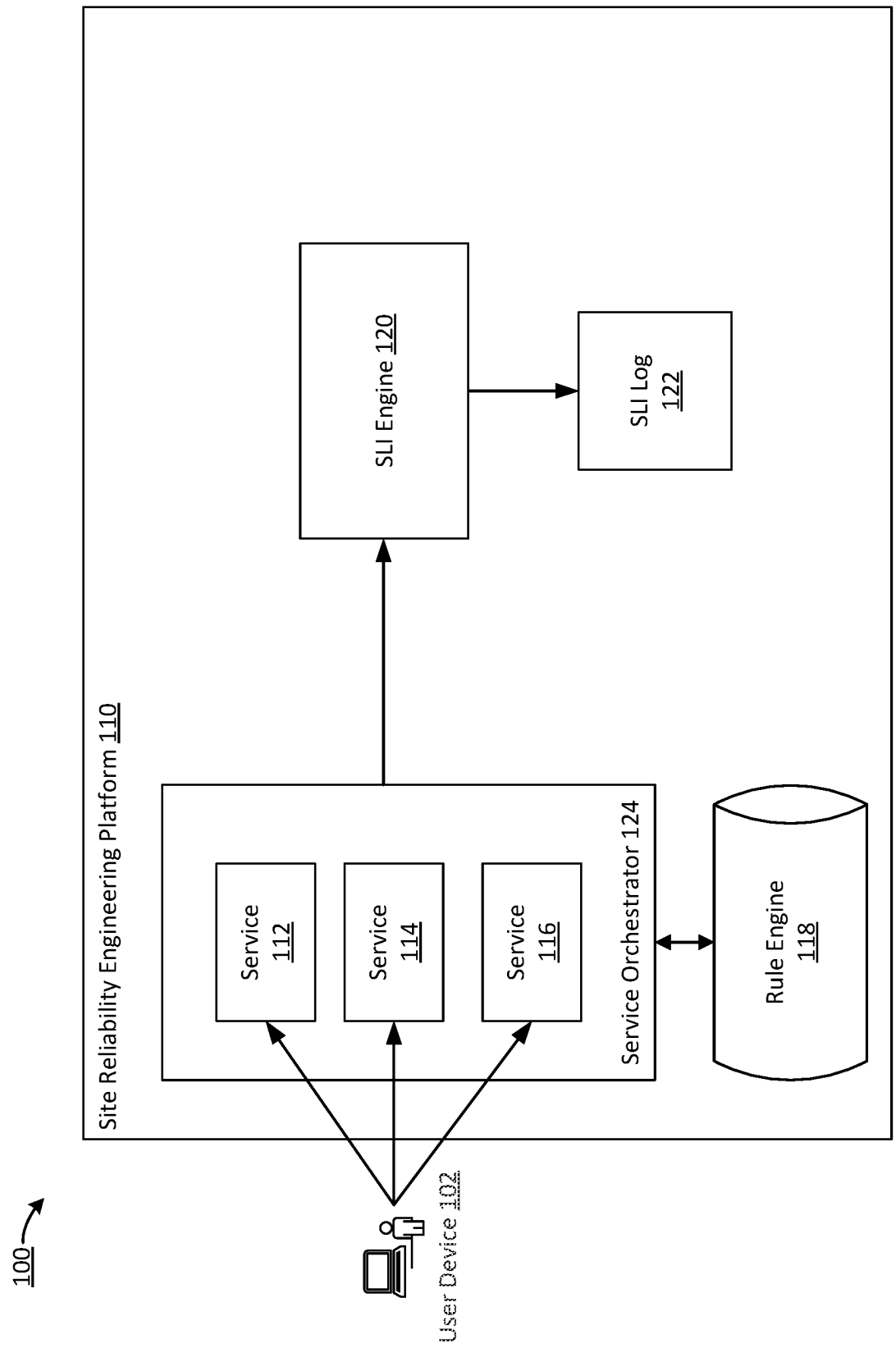
FIG. 1 is a block diagram of a system for providing site reliability engineering, in accordance with aspects.

Aspects generally relate to systems and methods for site reliability engineering.

In accordance with aspects, service level objectives may be defined and may act as thresholds under which a software service (i.e., a software application or part thereof) is deemed to be underperforming. Service level objectives may be measured through defined service level indicators, and corrective actions may be taken when monitored service level indicators fall below a corresponding threshold as defined in a corresponding service level objective. Moreover, service level agreements can be defined so that users of one or more services can understand a level at which a software service is intended to perform.

Site reliability engineering focuses on measuring and managing reliability and resiliency of software services. Service level objectives (SLOs), service level indicators (SLIs), and service level agreements (SLAs) may be primary metrics of site reliability engineering (SRE).

Service level objectives (SLOs) specify a target level for the reliability of a given technology service. SLOs represent a key input when making data-driven decisions about reliability. Accordingly, SLOs are at the core of SRE practices. SLO's may be user centric so as to reflect a user's experience while interacting with one or more services. Objectives which may be met to achieve corresponding service level agreements include a measure of user satisfaction with a particular user experience, development velocity vs. reliability, and achievable vs. acceptable objectives (e.g., an application or platform availability of 100% vs. an availability of 99.999%, which is a difference of 0 minutes vs. 5 minutes per year, respectively). Exemplary service level objectives include availability, latency, service desk response time, incident resolution time, etc.

In accordance with aspects, service level indicators include mechanisms through which a service level objective may be measured. Exemplary service level indicators include data latency, network traffic, error rate, saturation, etc. Service level indicators measure software and system behaviors that have a significant impact on a user's experience. These may include a ratio of favorable, acceptable, or successful events to a total number of events (e.g., the ratio of successful HTTP requests (i.e., an HTTP 200 successful response code or similar code indicating success) to a total number of HTTP request response codes), a number of requests completed in under 100 milliseconds (or some other acceptable time threshold), etc. The range of a service level indicator may be expressed as percentage points, i.e., from 0% to 100%. A zero percent value of a service level indicator may indicate an application, platform, or service that is down (i.e., not functioning in any respect) or that every defined indicator is performing below a defined baseline (i.e., below a defined SLO). Conversely, a one hundred percent value of a service level indicator may indicate that every indicator is performing at or above a defined baseline over a particular period of time.

In accordance with aspects, an error budget may express the difference between a defined service level objective and a measured service level objective. An error budget may be the basis for reaching a defined service level objective. Steps that may be taken in order to arrive at a defined service level objective include performance tuning, decreasing the velocity (the speed at which changes to a code base are submitted, reviewed and/or merged into production) of or freezing a code base, and enhanced monitoring of performance.

A service level agreement may be defined to provide a user with a clear picture of an application, service, or platform's level of functionality, reliability, and/or performance. An error budget may be focused to ensure that a service level agreement is not breached. Moreover, penalties may be assessed when service level agreements are breached (e.g., a reduction in the price of a service for a time when an SLA was not met). System and platform monitoring may be directed at levels that are lower than defined service level agreements in order to detect scenarios that may lead to SLA breaches and preemptively address such scenarios prior to a breach.

In accordance with aspects, service level indicators may be used to measure reliability of a service as defined by service level objectives. Moreover, a service level agreement may be defined based on one or more service level indicators. A service level agreement may be utilized by a user to understand a performance level that a corresponding service may operate at.

In accordance with aspects, in order to enhance a service's performance and reliability, service level indicators are defined that measure a service's performance. A set of targets of availability for achieving the defined performance level indicators may form service level objectives. Finally, a service level agreement may list minimum performance and reliability values, and this may allow a user to understand a service's capabilities. Accordingly, service level indicators may be foundational in building service level objectives, which, in turn, maps to the overall performance and reliability metrics assigned to a service level agreement.

In accordance with aspects, a site reliability engineering platform may be used to balance a service's reliability and performance with the pace of innovation and development of the service. Error budget calculations may be an effective way to measure an amount of error or underperformance with respect to service level indicators that may be allowed to accumulate over a given period before such errors or underperformance become unacceptable to users of the service.

A service level indicator may be expressed as a percentage and corresponding service level objectives may be derived from service level indicators. An error budget may be a remainder value of corresponding service level objectives. Accordingly, an error budget may be calculated as:

Error budget=[100−internal availability of a service level objective].

FIG. 4 is a table that displays exemplary acceptable unavailability windows for given time periods and for a given percentage of availability, in accordance with aspects.

In accordance with aspects, service level objectives may be prioritized in computations over service level agreements. The value of reliability in a service level agreement may be slightly lower than a historical average of an availability service level objective in order to safeguard against an initially high average due to a failure having not yet occurred. For instance, if a mean time between failures is 18 months and if a measured service is only 6 months old then the measured service level agreement may be artificially high. Further, if a reliability value is greater than or equal to an availability service level objective, then any buffer (i.e., any error budget) between a goal and the breaching of a service level agreement would be lost.

FIG. 1 is a block diagram of a system for providing site reliability engineering, in accordance with aspects. System 100 includes site reliability engineering platform 110. Site reliability engineering platform 110 includes service 112, service 114, and service 116. Site reliability engineering platform 110 further includes rule engine 118, service level indicator (SLI) engine 120, and SLI log 122. A user of site reliability engineering platform 110 may access site reliability engineering platform 110 and corresponding services via user device 102.

In accordance with aspects, user device 102 may be configured to be in operative communication with service 112, service 114, and service 116. Service 112, service 114 and service 116 may be computer applications, micro services, web services, etc. Service 112, service 114, and service 116 may each form a part of a user experience, and a user may perform operations and/or provide input with respect to service 112, service 114, and service 116. The user's combined operations and input across service 112, service 114, and 116 may constitute a user experience. A user experience may be a number of operations and/or inputs across a number of services that produces a particular output for a user. While FIG. 1 shows 3 services, it is contemplated that any necessary or desirable number of services may be used in order to define and/or achieve a user experience. For instance, some user experiences may include only a single service, while other user experiences utilize 5, 10, or more services.

In accordance with aspects, a rule engine may define how various services are interconnected with each other in order to achieve a user experience and provide the defined output of the user experience. Rule engine 118 stores the definition of a user experience across service 112, service 114, and service 116. That is, each user operation or input is compiled into a list of operations/inputs that, together, define a user experience that is carried out across service 112, service 114, and service 116. A user operation may be a command received from an interface to site reliability engineering platform 110 and/or any services associated with site reliability engineering platform 110. User input may be any data received in the same or a similar manner (i.e., via an interface). If a user experience is update (e.g., if an operation or input step is added with respect to a particular service), then the corresponding rule stored in rule engine 118 is updated to include the step or operation. Moreover, if a service is added or removed from a user experience, then all steps of a user experience are added or removed, respectively, to a corresponding experience rule stored in rule engine 118.

In accordance with aspects, service orchestrator 124 orchestrates services service 112, service 114, and service 116 in order to provide a user experience according to an associated experience rule stored in rule engine 118. Service orchestrator 124 may provide an interface through which a user of user device 102 may interact with service 112, service 114, and service 116 in order to participate in a user experience and generate an outcome associated with the user experience.

In accordance with aspects, SLI engine 120 receives service performance metrics from service orchestrator 124. The service metrics data are passed as input to SLI engine 120, e.g., via a batch file on a recurring basis, via a data stream, etc. Based on these metrics SLI engine 120 may calculate service level indicators for each service along with an associated user experience as defined in rule engine 118. In accordance with aspects, SLI engine 120 may define service level indicators for objectives such as latency, throughput, availability, capacity, etc.

In accordance with aspects, an availability service level indicator may be calculated as a ratio or fraction of acceptable events over total events (e.g. acceptable events/total events). An acceptable event is any user-initiated request (e.g., to a web server, application server, etc.) that is successfully processed by the receiving computer application, service, etc.

A latency service level indicator may be calculated by rule engine 118 as a function of each service. A total latency may be calculated from a total number of services involved to process a user request. For instance, if service 114 takes 3 milliseconds (ms) to process a particular request (i.e., a sub-portion of a request) and service 116 takes 5 ms to process a remaining portion of a request, then the overall time will be 8 ms. Network latency may also be included in the latency calculation (e.g., network traffic hops between switches, routers, servers, and other network nodes that the traffic passes through). That is, the latency of service 112 may be X1, the latency of service 114 may be X2, and the latency of service 116 may be X3. If a user experience includes interaction with each of these services (i.e., operations and/or input to each of these services), then the total latency for the user experience will be X1+X2+X3. Accordingly, the latency for a user experience may be the sum total of the latency of each component service.

Throughput may be a measure of a data processing rate of a computer application and/or network communication nodes. Throughput may be measured as over or under a threshold. A throughput threshold may be a minimal acceptable amount of data processing over time, e.g., a number of times where a data processing rate of a computer application/service is faster than the specified thresholds as opposed to slower than the threshold. An exemplary threshold throughput may be measured as an amount of data (e.g., 100 megabytes (MB)) over a time period (e.g., 1 minute), i.e., 100 MB/minute or 100 MB per minute.

A capacity SLI may indicate a peak capacity which the system has been measured (either actually or theoretically) as capable of handling. Some exemplary indicators with respect to capacity are a number of concurrent users the system is capable of handling, a total number of transactions per second which the system is capable of handling (where, e.g., a "transaction" is a completed processing request across one or more computer applications/serves), or a maximum payload which a system/service is capable of handling (e.g., a maximum application programming interface (API) method argument payload, a maximum file size ingestion, etc.).

In accordance with aspects, if SLI engine 120 indicates a drop in any defined service level indicator below a threshold level (i.e., below a service level objective), then SLI engine 120 may write the drop below the corresponding SLO as an event to SLI log 122. Moreover, SLI engine 120 may send an alert via one or more channels (e.g., email, short message service (SMS), a monitored dashboard, etc.), so that the required attention may be directed to the service and the underperforming service level indicator.

Figure 2:
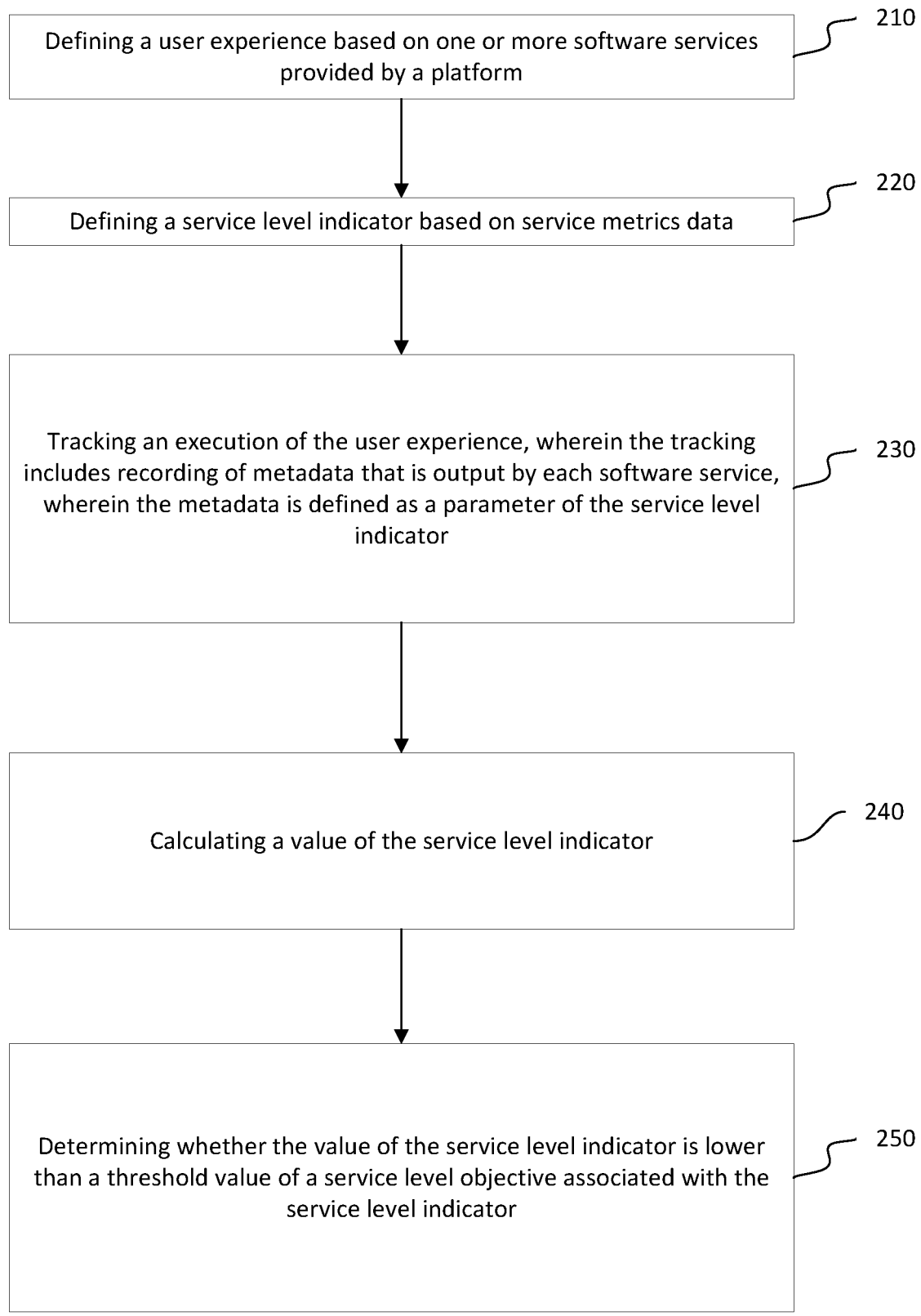
FIG. 2 is a logical flow for providing site reliability engineering, in accordance with aspects.

FIG. 2 is a logical flow for providing site reliability engineering, in accordance with aspects.

Step 210 includes defining a user experience based on one or more software services provided by a platform.

Step 220 includes defining a service level indicator based on service metrics data. In some aspects, a plurality of service level indicators may be defined and generated. In some aspects, the platform may store the defined service level indicator(s). In some aspects, the service level indicator may be based on a service level objective.

Step 230 includes tracking an execution of the user experience, wherein the tracking includes recording of metadata that is output by each software service, wherein the metadata is defined as a parameter of the service level indicator.

Step 240 includes calculating a value of the service level indicator.

Step 250 includes determining whether the value of the service level indicator is lower than a threshold value of a service level objective associated with the service level indicator. In some aspects, upon a determination that the value of the service level indicator is lower than the threshold value of a service level objective associated with the service level indicator, an alert may be sent via a designated channel. The alert may be to an administrative user, or to an administrative application/interface. In some aspects, the platform may log the value of the service level indicator(s) for historical viewing and analysis.

Figure 3:
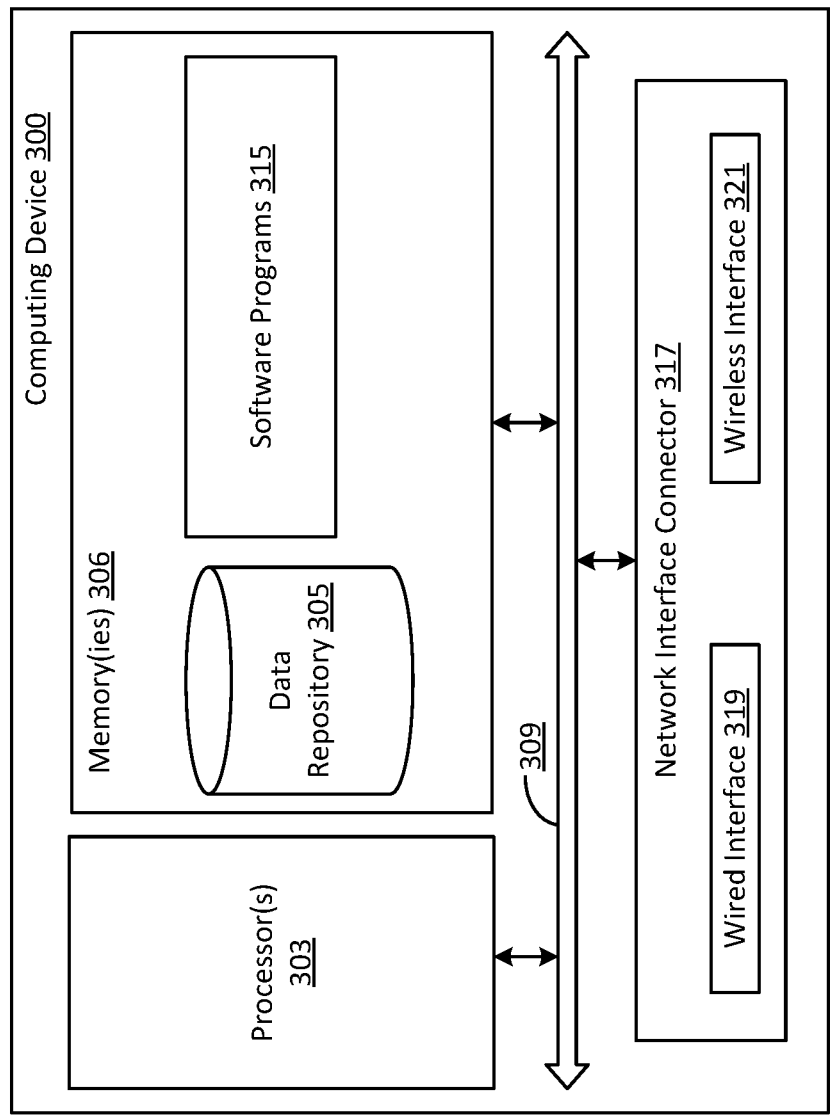
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as one or more software services, a service orchestrator, and SLI engine, an SLI log, a rule engine, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine," a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
    defining a user experience based on at least two software services provided by a platform, wherein the user experience is a product of the at least two software services, wherein at least one software service receives a user input;
    defining a service level indicator based on service metrics data received from an interface and at the platform, the interface interacting with the two software services to provide the user experience;
    tracking an execution of the user experience, wherein the tracking includes recording of metadata that is output by each software service, wherein the metadata is defined as a parameter of the service level indicator;
    calculating a value of the service level indicator from the parameter and for each software service; and
    determining whether the value of the service level indicator is lower than a threshold value of a service level objective associated with the service level indicator.

2. The method of claim 1, wherein the service level indicator measures latency of the user experience by finding a sum of a latency of each software service.

3. The method of claim 1, wherein the service level indicator measures a throughput of the user experience by measuring an amount of data processed over a time period for each software service.

4. The method of claim 1, the service metrics data is collected via a batch file on a recurring basis or a data stream.

5. The method of claim 1, wherein a service level agreement is generated based on the service level objective.

6. The method of claim 1,
    wherein the service level indicator measures a peak capacity of the user experience by determining a payload each software service can intake.

7. The method of claim 1, comprising:
    sending, upon a determination that the value of the service level indicator is lower than the threshold value of a service level objective associated with the service level indicator, an alert via a designated channel; and
    logging the value of the service level indicator.

8. A system comprising at least one computer including a processor, wherein the at least one computer is configured to:
    store a user experience based on at least two software services provided by a platform, wherein the user experience is a product of the at least two software services, wherein at least one software service receives a user input;
    store a service level indicator based on service metrics data received from an interface and at the platform, the interface interacting with the two software services to provide the user experience;
    track an execution of the user experience, wherein the tracking includes recording of metadata that is output by each software service, wherein the metadata is defined as a parameter of the service level indicator;
    calculate a value of the service level indicator from the parameter and for each software service; and
    determine whether the value of the service level indicator is lower than a threshold value of a service level objective associated with the service level indicator.

9. The system of claim 8, wherein the service level indicator measures latency of the user experience by finding a sum of a latency of each software service.

10. The system of claim 8, wherein the service level indicator measures a throughput of the user experience by measuring an amount of data processed over a time period for each software service.

11. The system of claim 8, wherein a service level agreement is generated based on the service level objective.

12. The system of claim 8,
    wherein the service level indicator measures a peak capacity of the user experience by determining a payload each software service can intake.

13. The system of claim 8, wherein the at least one computer is configured to:
    send, upon a determination that the value of the service level indicator is lower than the threshold value of a service level objective associated with the service level indicator, an alert via a designated channel; and
    log the value of the service level indicator.

14. A non-transitory computer readable storage medium, including instructions stored thereon, which instructions, when read and executed by one or more computer processors, cause the one or more computer processors to perform steps comprising:
    defining a user experience based on at least two software services provided by a platform, wherein the user experience is a product of the at least two software services, wherein at least one software service receives a user input;
    defining a service level indicator based on service metrics data received from an interface and at the platform for each software service, the interface interacting producing an output from the at least two software services to provide the user experience;
    tracking an execution of the user experience, wherein the tracking includes recording of metadata that is output by each software service, wherein the metadata is defined as a parameter of the service level indicator;
    calculating a value of the service level indicator from the parameter and for each software service; and determining whether the value of the service level indicator is lower than a threshold value of a service level objective associated with the service level indicator.

15. The non-transitory computer readable storage medium of claim 14, wherein the service level indicator measures latency of the user experience by finding a sum of a latency of each software service.

16. The non-transitory computer readable storage medium of claim 14, wherein the service level indicator measures a throughput of the user experience by measuring an amount of data processed over a time period for each software service.

17. The non-transitory computer readable storage medium of claim 14, wherein the service metrics data is collected via a batch file on a recurring basis or a data stream.

18. The non-transitory computer readable storage medium of claim 14, wherein a service level agreement is generated based on the service level objective.

19. The non-transitory computer readable storage medium of claim 14,
wherein the service level indicator measures a peak capacity of the user experience by determining a payload each software service can intake.

20. The non-transitory computer readable storage medium of claim 14, comprising:
sending, upon a determination that the value of the service level indicator is lower than the threshold value of a service level objective associated with the service level indicator, an alert via a designated channel; and
logging the value of the service level indicator.

* * * * *